US011879383B2

(12) United States Patent
Grubba et al.

(10) Patent No.: US 11,879,383 B2
(45) Date of Patent: Jan. 23, 2024

(54) TORQUE LIMITING DEVICE IN A CONNECTION BETWEEN A GEARBOX AND A STATIONARY STRUCTURE IN A GAS TURBINE ENGINE AND A GAS TURBINE ENGINE

(71) Applicant: Rolls-Royce Deutschland Ltd & Co KG, Blankenfelde-Mahlow (DE)

(72) Inventors: Tomasz Grubba, Zeuthen (DE); Jos Raven, Potsdam (DE)

(73) Assignee: ROLLS-ROYCE DEUTSCHLAND LTD & CO KG, Blankenfelde-Mahlow (DE)

( * ) Notice: Subject to any disclaimer, the term of this patent is extended or adjusted under 35 U.S.C. 154(b) by 184 days.

(21) Appl. No.: 17/181,100

(22) Filed: Feb. 22, 2021

(65) Prior Publication Data

US 2021/0270147 A1    Sep. 2, 2021

(30) Foreign Application Priority Data

Feb. 27, 2020    (DE) ..................... 10 2020 105 227.8

(51) Int. Cl.
*F02C 7/32*        (2006.01)
*F01D 21/04*       (2006.01)
(Continued)

(52) U.S. Cl.
CPC ............... *F02C 7/32* (2013.01); *B64D 27/10* (2013.01); *B64D 31/06* (2013.01); *B64D 31/14* (2013.01); *F01D 21/045* (2013.01); *F01D 21/06* (2013.01); *F01D 25/162* (2013.01); *F16H 57/025* (2013.01); *H01H 35/00* (2013.01);
(Continued)

(58) Field of Classification Search
CPC ...... F01D 21/045; F01D 21/06; F01D 25/162; B64D 27/10; B64D 31/06; B64D 31/14; B64D 2033/0293; F02C 7/32; F02C 7/36; F16H 57/025; H01H 35/00; F02D 2009/0249; F02D 2200/10;
(Continued)

(56) References Cited

U.S. PATENT DOCUMENTS

2004/0156669 A1*   8/2004   Lejeune ................. F01D 25/16
                                                     403/2
2018/0080504 A1    3/2018   Boniface
(Continued)

FOREIGN PATENT DOCUMENTS

EP    3396115 A1 * 10/2018
EP    3444445 A1 *  2/2019 ............... F02C 7/36
EP    3527788 A1 *  8/2019 ............. F01D 21/04

OTHER PUBLICATIONS

German Search Report dated Oct. 5, 2020 from counterpart German Patent Application No. 102020105227.8.

*Primary Examiner* — Dominick L Plakkoottam
*Assistant Examiner* — Paul W Thiede
(74) *Attorney, Agent, or Firm* — SHUTTLEWORTH & INGERSOLL, PLC; Timothy J. Klima (57) ABSTRACT

The invention relates to a torque limiting device in a torque bearing connecting structure between a gearbox and a stationary structure in a gas turbine engine, wherein the torque limiting device comprises a mechanical fuse in the connection structure comprising an at least partially circumferential weakening of the material. The invention also relates to a gas turbine engine.

18 Claims, 6 Drawing Sheets

(51) Int. Cl.
*F16H 57/025* (2012.01)
*B64D 27/10* (2006.01)
*B64D 31/06* (2006.01)
*F01D 25/10* (2006.01)
*F01D 21/06* (2006.01)
*B64D 31/14* (2006.01)
*H01H 35/00* (2006.01)
*F02D 9/02* (2006.01)
*B64D 33/02* (2006.01)
*F02C 7/36* (2006.01)
*F01D 25/16* (2006.01)

(52) U.S. Cl.
CPC ........ *B64D 2033/0293* (2013.01); *F02C 7/36* (2013.01); *F02D 2009/0249* (2013.01); *F02D 2200/10* (2013.01); *F05D 2250/712* (2013.01); *F05D 2260/311* (2013.01); *F05D 2260/4031* (2013.01); *F05D 2260/40311* (2013.01); *Y02T 50/60* (2013.01)

(58) Field of Classification Search
CPC ..... F05D 2250/712; F05D 2260/40311; F05D 2260/311; F05D 2260/4031; Y02T 50/60
See application file for complete search history.

(56) References Cited

U.S. PATENT DOCUMENTS

| | | |
|---|---|---|
| 2019/0055852 A1 | 2/2019 | Wuestenberg |
| 2019/0257213 A1* | 8/2019 | Zilli ..................... F01D 21/045 |
| 2019/0323434 A1* | 10/2019 | Slayter ................... F01D 25/36 |
| 2020/0056496 A1* | 2/2020 | Bewick .................. F01D 25/32 |

* cited by examiner

TORQUE LIMITING DEVICE IN A CONNECTION BETWEEN A GEARBOX AND A STATIONARY STRUCTURE IN A GAS TURBINE ENGINE AND A GAS TURBINE ENGINE

This application claims priority to German Patent Application DE102020105227.8 filed Feb. 27, 2020, the entirety of which is incorporated by reference herein.

The present disclosure relates to a torque limiting device in a torque bearing connection between a gearbox and a stationary structure in a gas turbine engine with features as disclosed herein and a gas turbine engine with the features as disclosed herein.

Gas turbine engines for aircraft can comprise a gearbox, in particular an epicyclic gearbox, to reduce the rotational speed from a driving turbine section to e.g. a fan. These types of aircraft engines are generally termed as geared turbofan engines. The epicyclic gearbox can have e.g. a star configuration in which a carrier of the planetary gears is stationary (i.e. fixed) relative to a stationary structure of the gas turbine engine or a planetary configuration in which a ring gear is mounted fixedly relative to a stationary structure of the gas turbine engine.

Given the thrust produced by those gas turbine engines, the torque transmitted through the gearbox is considerably high. The connection between the gearbox and the stationary structure (i.e. a mounting structure) can carry normal loads (force, torque), including limit cases and fatigue cases. However, an extremely high torque might jeopardize some parts in the extended load path (i.e. from the gearbox to the stationary structure, engine mounts, wing structure etc.). Therefore, the transmitted torque must be limited at one torque threshold to prevent further damage to the gas turbine engine.

Hence, efficient means for limiting the torque are required.

According to a first aspect there is provided a torque limiting device in a torque bearing connecting structure between a gearbox and a stationary structure in a gas turbine engine. The connection structure locates or fixes the gearbox within the gas turbine engine. During operation torque is transmitted through the gearbox into a stationary structure which can comprise multiple elements. The torque limiting device comprises a mechanical fuse in the connection structure comprising an at least partially circumferential weakening of the material, i.e. the weakening is located geometrically around the rotational axis of the gas turbine engine.

In one embodiment, the mechanical fuse with the predetermined material weakening comprises a reduction (thinning) in the cross-section of the material. By locating the cross-sectional reduction at a particular position, the location of the mechanical fuse, i.e. the intended rupture can be predetermined.

In one embodiment, the mechanical fuse comprises a fully circumferential weakening of the material, e.g. the continuous thinning extends not only over parts of the circumference but is continuous around the complete 360° circumference.

The mechanical fuse is designed to release only under shear stress which implies that it is designed e.g. not to give way under bending moments or forces.

Furthermore, the mechanical fuse can comprise a smooth profile in cross-section, in particular free of interruptions or holes. The cross-section defines the predetermined material weakening. Having a smooth profile implies no sharp kinks in the profile. In particular, (see FIGS. 6-8) the profile can comprise a convex section (70), a concave section (72), and at least one section (74) with a constant width radially outward from the mechanical fuse.

In another embodiment, the material thinning of the mechanical fuse is continuous and axisymmetric around the rotational axis of the gas turbine engine. This enables an efficient and defined rupturing by shear forces.

The mechanical fuse, in one embodiment, can be positioned in a plate radially extending away from the connection structure, in particular in a ring gear mount of the gearbox. The plate can extend radially inwards or outwards. Alternatively, the mechanical fuse can be positioned in an axially oriented section in a ring gear mount of the gearbox.

The mechanical fuse, in one embodiment, can be positioned on the output side of the gearbox, in particular a static, torque-reacting part.

In principle, epicyclic gearboxes having a planetary, a solar or a star configuration can be used in connection with an embodiment of torque limiting devices. Depending on the configuration, the moving and stationary parts of the gearbox will vary. In case of a planetary configuration, the planet carrier and the sun wheel are the moving parts, the ring gear is the stationary part.

As noted elsewhere herein, the present disclosure may relate to a gas turbine engine. Such a gas turbine engine may comprise an engine core comprising a turbine, a combustor, a compressor and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor and a second core shaft connecting the second turbine to the second compressor. The second turbine, second compressor and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds). These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform.

The radius of the fan may be measured between the engine centerline and the tip of a fan blade at its leading edge. The fan diameter (which may simply be twice the radius of the fan) may be greater than (or on the order of) any of: 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 (around 150 inches) cm or 390 cm (around 155 inches). The fan diameter may be in an inclusive range bounded by any two of the values in the previous sentence (i.e. the values may form upper or lower bounds).

The rotational speed of the fan may vary in use. Generally, the rotational speed is lower for fans with a higher diameter. Purely by way of non-limitative example, the rotational speed of the fan at cruise conditions may be less than 2500 rpm, for example less than 2300 rpm. Purely, by way of further non-limitative example, the rotational speed of the fan at cruise conditions for an engine having a fan diameter in the range of from 250 cm to 300 cm (for example 250 cm to 280 cm) may be in the range of from 1700 rpm to 2500 rpm, for example in the range of from 1800 rpm to 2300 rpm, for example in the range of from 1900 rpm to 2100 rpm. Purely, by way of further non-limitative example, the rotational speed of the fan at cruise conditions for an engine having a fan diameter in the range of from 320 cm to 380 cm may be in the range of from 1200 rpm to 2000 rpm, for example in the range of from 1300 rpm to 1800 rpm, for example in the range of from 1400 rpm to 1600 rpm.

In use of the gas turbine engine, the fan (with associated fan blades) rotates about a rotational axis. This rotation results in the tip of the fan blade moving with a velocity $U_{tip}$. The work done by the fan blades 13 on the flow results in an enthalpy rise dH of the flow. A fan tip loading may be defined as $dH/U_{tip}^2$, where dH is the enthalpy rise (for example the 1-D average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.3, 0.31, 0.32, 0.33, 0.34, 0.35, 0.36, 0.37, 0.38, 0.39 or 0.4 (all units in this paragraph being $Jkg^{-1} K^{-1}/(ms^{-1})^2$). The fan tip loading may be in an inclusive range bounded by any two of the values in the previous sentence (i.e. the values may form upper or lower bounds).

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements, the bypass ratio may be greater than (or on the order of) any of the following: 10, 10.5, 11, 11.5, 12, 12.5, 13, 13.5, 14, 14.5, 15, 15.5, 16, 16.5, or 17. The bypass ratio may be in an inclusive range bounded by any two of the values in the previous sentence (i.e. the values may form upper or lower bounds). The bypass duct may be substantially annular. The bypass duct may be radially outside the core engine. The radially outer surface of the bypass duct may be defined by a nacelle and/or a fan case.

The overall pressure ratio of a gas turbine engine as described and/or claimed herein may be defined as the ratio of the stagnation pressure upstream of the fan to the stagnation pressure at the exit of the highest pressure compressor (before entry into the combustor). By way of non-limitative example, the overall pressure ratio of a gas turbine engine as described and/or claimed herein at cruise may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds).

Specific thrust of an engine may be defined as the net thrust of the engine divided by the total mass flow through the engine. At cruise conditions, the specific thrust of an engine described and/or claimed herein may be less than (or on the order of) any of the following: 110 $Nkg^{-1}$ s, 105 $Nkg^{-1}$ s, 100 $Nkg^{-1}$ s, 95 $Nkg^{-1}$ s, 90 $Nkg^{-1}$ s, 85 $Nkg^{-1}$ s or 80 $Nkg^{-1}$ s. The specific thrust may be in an inclusive range bounded by any two of the values in the previous sentence (i.e. the values may form upper or lower bounds). Such engines may be particularly efficient in comparison with conventional gas turbine engines.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). The thrust referred to above may be the maximum net thrust at standard atmospheric conditions at sea level plus 15 deg C. (ambient pressure 101.3 kPa, temperature 30 deg C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. At cruise, the TET may be at least (or on the order of) any of the following: 1400K, 1450K, 1500K, 1550K, 1600K or 1650K. The TET at cruise may be in an inclusive range bounded by any two of the values in the previous sentence (i.e. the values may form upper or lower bounds). The maximum TET in use of the engine may be, for example, at least (or on the order of) any of the following: 1700K, 1750K, 1800K, 1850K, 1900K, 1950K or 2000K. The maximum TET may be in an inclusive range bounded by any two of the values in the previous sentence (i.e. the values may form upper or lower bounds). The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example, at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium based metal or an aluminum based material (such as an aluminum-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminum based body (such as an aluminum lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades may be formed integrally with a central portion. Such an arrangement may be referred to as a blisk or a bling. Any suitable method may be used to manufacture such a blisk or bling. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 16, 18, 20 or 22 fan blades.

As used herein, cruise conditions may mean cruise conditions of an aircraft to which the gas turbine engine is attached. Such cruise conditions may be conventionally defined as the conditions at mid-cruise, for example the conditions experienced by the aircraft and/or engine at the midpoint (in terms of time and/or distance) between top of climb and start of decent.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be the cruise condition. For some aircraft, the cruise conditions may be outside these ranges, for example below Mach 0.7 or above Mach 0.9.

Purely by way of example, the cruise conditions may correspond to standard atmospheric conditions at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to: a forward Mach number of 0.8; a pressure of 23000 Pa; and a temperature of −55 deg C.

As used anywhere herein, "cruise" or "cruise conditions" may mean the aerodynamic design point. Such an aerodynamic design point (or ADP) may correspond to the conditions (comprising, for example, one or more of the Mach number, environmental conditions and thrust requirement) for which the fan is designed to operate. This may mean, for example, the conditions at which the fan (or gas turbine engine) is designed to have optimum efficiency.

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

Embodiments will now be described by way of example only, with reference to the Figures, in which.

Figure 1:
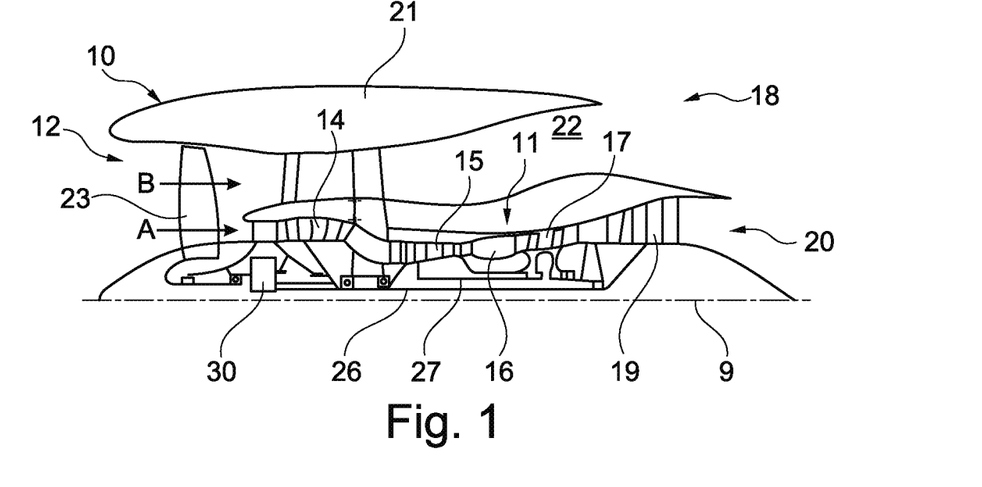
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through and thereby drive, the high pressure and low pressure turbines 17, 19 before being exhausted through the nozzle 20 to provide some propulsive thrust. The high pressure turbine 17 drives the high pressure compressor 15 by a suitable interconnecting shaft 27. The bypass flow generally provides the majority of the propulsive thrust. The epicyclic gearbox 30 is a reduction gearbox.

Figure 2:
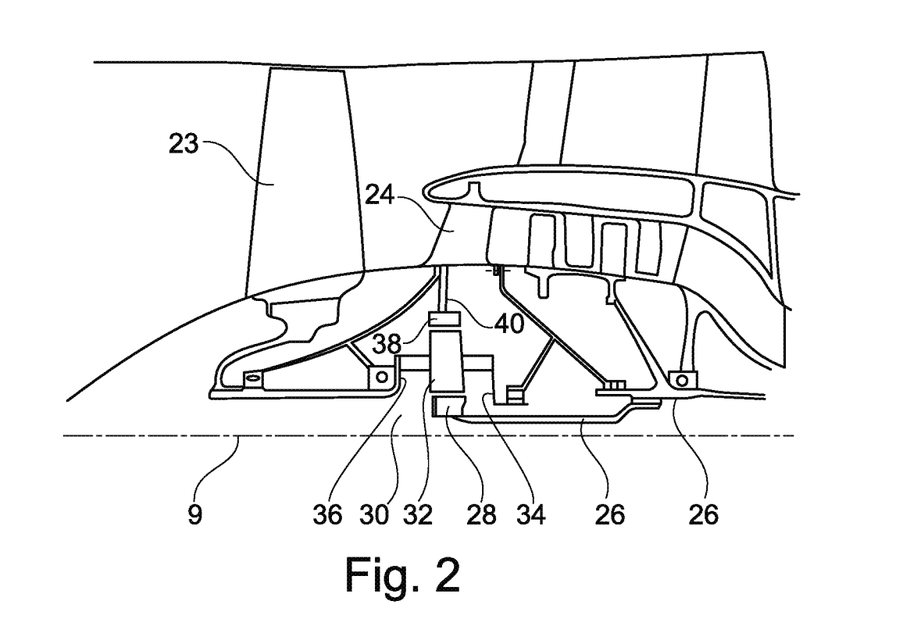
FIG. 2 is a close up sectional side view of an upstream portion of a gas turbine engine.

An exemplary arrangement for a geared fan gas turbine engine 10 is shown in FIG. 2. The low pressure turbine 19 (see FIG. 1) drives the shaft 26, which is coupled to a sun wheel, or sun gear 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to rotate around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled via linkages 40 to a stationary supporting structure 24. In the embodiments described below, two ring gears 38 are used, each nominally reacting half of the total torque. They are connected to a static structure by means of a diaphragm-like design called Ring Gear Mount (RGM).

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
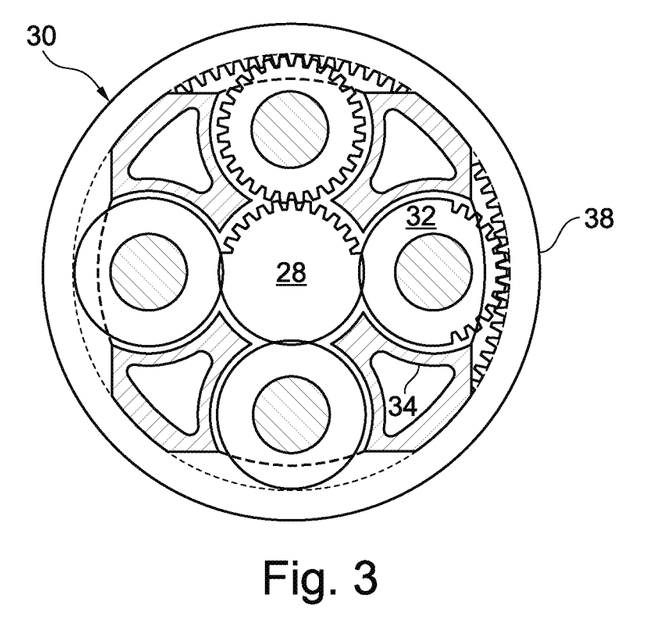
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 20, 22 meaning that the flow through the bypass duct 22 has its own nozzle that is separate to and radially outside the core engine nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10 and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

In connection with FIGS. 4 to 8 different embodiments of a torque limiting device 50 are described. These different embodiments of a torque limiting device 50 are intended to efficiently limit the torque in case of an over-torque situation, i.e. the exceeding of an activation limit for the torque in a connection structure 60 between the gearbox 30 and a stationary structure such as e.g. the support structure 24. The expected over-torque situation, in particular an increase beyond the shear failure load level, can be a combination of random variables and in particular depends mainly on scatter in material strength properties and dimensional tolerances affecting the net shear area.

The main purpose of a torque limiting device 50 is generally to prevent damage, to avoid dangerous loading and to reduce weight. The latter is achieved by reducing the maximum load of other components in the gas turbine engine 10. Hence, those other components can safely be made lighter and weaker than would be acceptable without the presence of a torque limiting device 50.

The described embodiments integrate this torque limiting function into the torque transferring connecting structure 60. The embodiments of the torque limiting device 50 are shown here with a shear mechanism in case of an over-torque situation, but in principle other failure modes are possible.

The embodiments described herein introduce a mechanical fusing and a containment capability into the connection structure 60 comprising a ring gear mount 62.

Figure 4:
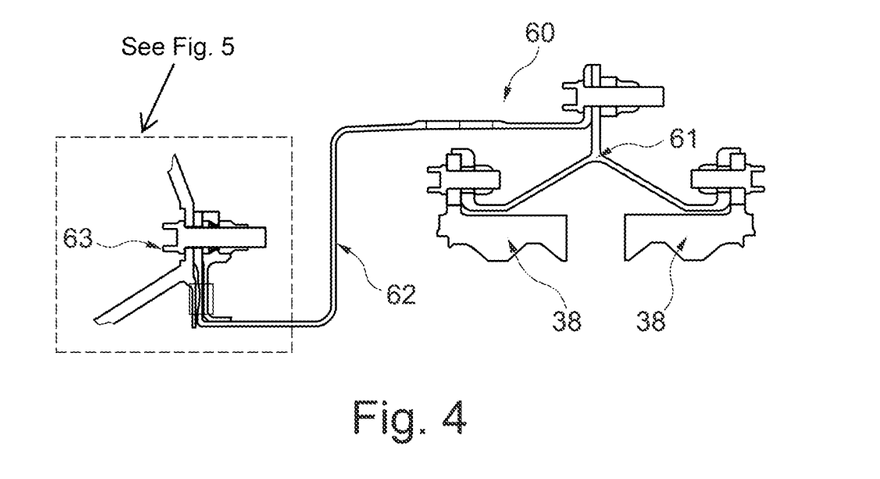
FIG. 4 is a schematic cross-sectional view of a connection structure between a gearbox and a stationary structure of a gas turbine engine.

FIG. 4 refers to an embodiment involving an epicyclic gearbox 30 with a planetary configuration. This implies that the ring gear 38 (see e.g. FIG. 3) is stationary, i.e. it is fixed relative to a stationary structure 63 (also termed as static structure), e.g. a structure connected to a front nose cone in the gas turbine engine 10. The load path goes from the static structure through the engine mounts to the aircraft.

The epicyclic gearbox 30 itself is not shown in FIG. 4. The two ring gears 38 shown in FIG. 4 represent the stationary part of the gearbox 30. Under normal operation conditions the torque is transmitted through a ring gear support 61 and a ring gear mount 62 into the stationary structure 63. Therefore, the connection structure 60 comprises the parts between the ring gears 38 and the stationary structure 63.

As will be shown below, the torque limiting device 50 is positioned in that connecting structure 60.

The ring gear mount 62 in the shown embodiment is attached to an engine front stationary structure 63, resulting in the torque loads being exerted onto that structure, engine mounts or even onto a corresponding wing structure.

Figure 5:
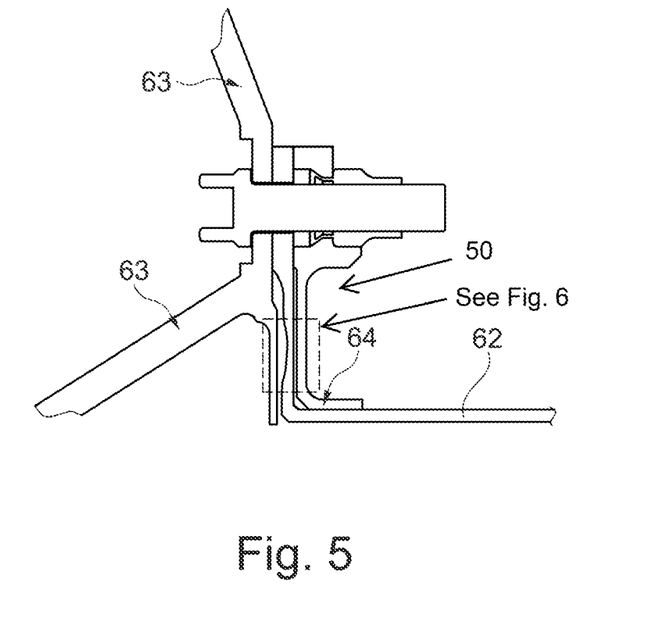
FIG. 5 is an enlarged view of an embodiment of the connection structure to the stationary structure with a mechanical fuse comprising a predetermined weakening of the material.

The connection between the ring gear mount 62 and the stationary structure 63 is shown in detail in FIG. 5 (indicated by frame in FIG. 4).

Figure 6:
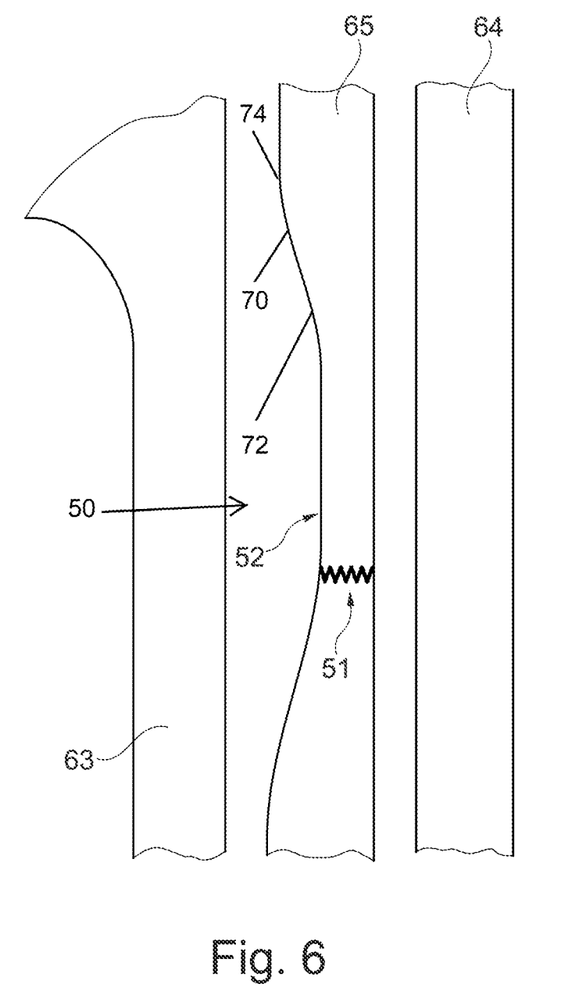
FIG. 6 is a detail of the mechanical fuse comprising the predetermined weakening of the material.

At the distal end of the ring gear mount 62 (as seen from the gearbox 30), a retention plate 64 extents radially outwards from the ring gear mount. The retention plate 64 itself is part of or connected to the connection structure 60 which connects to the stationary structure 63, the details are shown in FIG. 6 (indicated by frame in FIG. 5). The function of the retention plate 64 will be explained below.

FIG. 6 shows an enlarged view of the framed area of FIG. 5. The ring gear mount 62 extends at its distal end radially outwards forming a circumferential plate 65 (or flange) so that the retention plate 64 and the circumferential plate 65 run in parallel.

The mechanical fuse 51 itself, when looking at the cross-sectional view of FIG. 6, is a radially varying necking profile 52 extending circumferentially (i.e. circumventing the rotational axis 9) on the whole circumferential plate 65, the plate extending away from the ring gear mount 62.

The profile 52 in this embodiment is one example of a predetermined weakening of the material in the connection structure 60 by thinning the cross-section deliberately.

Because the profile 52 in this embodiment is a continuous axisymmetric feature, this portion of the ring gear mount 62 will lose its structural integrity under over-torque conditions by tearing-off circumferentially into two separate parts. Continuous means that the material does not have any interruptions such as e.g. holes.

In FIG. 6 only the cross-section of that tearing is indicated.

The tearing—shown in FIG. 6—occurs at the very bottom of the thinnest section of the mechanical fuse 51 profile, if the applied torque load produces shear stress equivalent to the ultimate tensile strength condition.

Upon tearing of the mechanical fuse 51, the circumferential plate 65 of the ring gear mount 62 splits into two separate parts.

The circumferential plate 65 radially outwards from the circumferential tearing line 51 is bolted to the stationary structure 63. Thus, once the intended controlled failure occurs, it should remain mounted and non-moving, whereas the remainder of the ring gear mount 62 radially inwards from the tearing line of 51 may spin up and keep rotating, while pushing the new tearing line 51 contacting interface from the bottom and sliding on it.

In order to avoid the hazards such as clashes with other components, the retention plate 64 controls the axial and radial position of the portion of the ring gear mount 62 that has become free to rotate, after the tearing of the mechanical fuse 51, as described above.

FIGS. 4 and 5 show a ring gear mount 62 attached to the front stationary structure 63 by means of a bolted flange. Due to the heterogeneity and alternating nature of the stresses at the rear of the ring gear mount 62, closer to the interface with the gear train, the mechanical fuse 51 is positioned toward the front of the ring gear mount 62, i.e. further away from the interface with the gear train. Here, the stresses are more homogenous and less alternating, thus an additional risk of high cycle fatigue due to torque transmission only is greatly reduced. The positioning away from the interface with the gear train can be achieved by moving to the input side, the output side, or radially outwards.

In other embodiments, not shown here, the mechanical fuse 51 can be towards the input side of the gearbox 30, as there can also be connection structures 60 to stationary structures 63. The mechanical fuse can be located in a static, torqure-reacting component.

Figure 7:
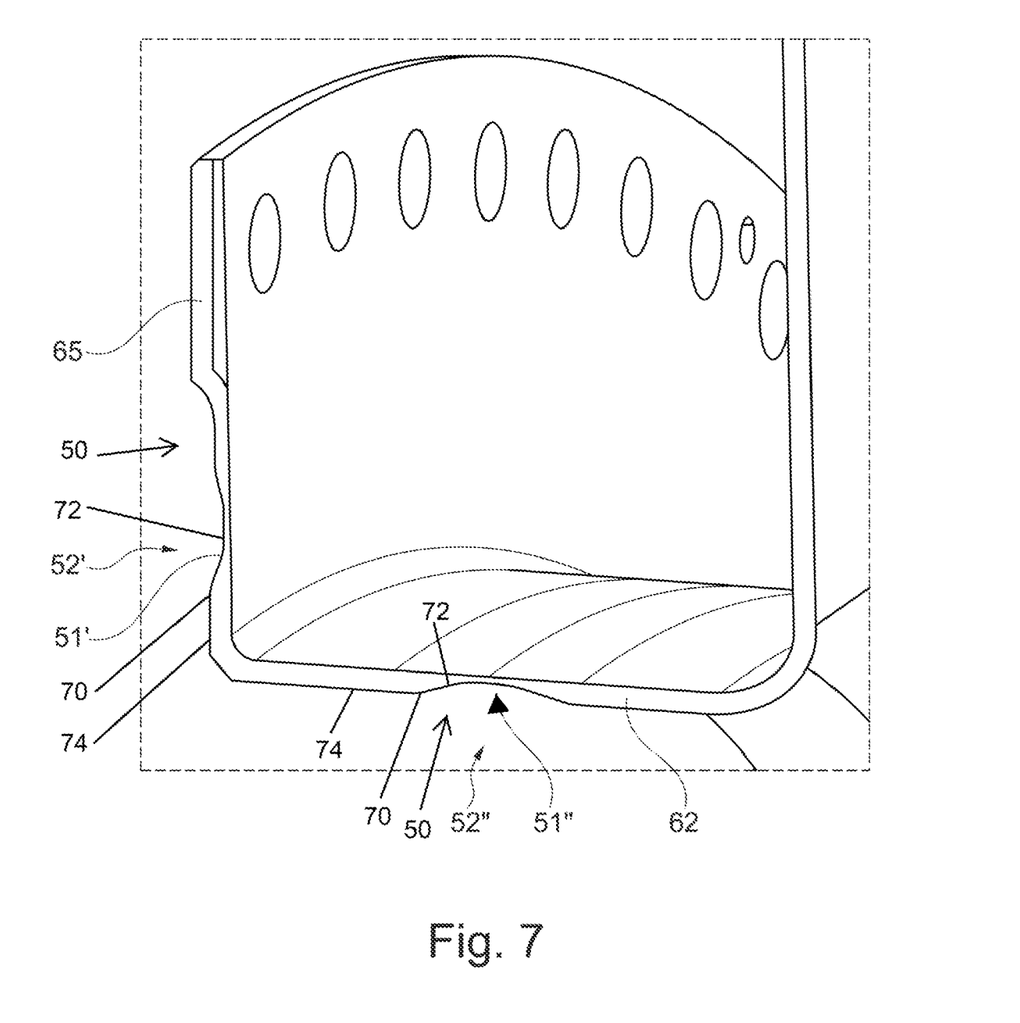
FIG. 7 is a perspective view of a part in an embodiment of the connection structure showing two mechanical fuses with predetermined weakening of the material.

FIG. 7 shows another embodiment of the distal end of the ring gear mount 62 having an axial (horizontal) part which continues into the radial circumferential plate 65.

Here, two alternative positions of the mechanical fuse 51 are shown.

The first position of the mechanical fuse 51' is on the radial part, the circumferential plate 65 just below the front flange. The mechanical fuse 51' with the intentional rupture location is at the thinnest part of the profile 52' (i.e. the cross-section in the plate 65).

The second position of the mechanical fuse 51" is in the axial part on the tubular section of the ring gear mount 62. Again, the mechanical fuse 51" is in the thinnest part of the profile 52".

The latter can be designed to be thinner and would be much more sensitive to deviations in dimension tolerances. At any given tolerance accuracy, the axially located mechanical fuse 51" option would add somewhat to the manufacturing complexity. This is because axially oriented shear mechanical fuses 51" overly constrain the design space: The shear stress for a given torque here is proportional to the inverse radius cubed, and geometrically the shear face thickness is defined by the inner and outer radii. Radially oriented shear mechanical fuses 51' do not constrain the design space so tightly: The shear stress for a given torque here is proportional to the inverse radius squared, and geometrically the shear face thickness can be defined independent of radius.

The cross-sectional profile 52, 52', 52" of the mechanical fuses 51, 51', 51" is continuous and axisymmetric in each embodiment. Continuous means, as mentioned above, that the mechanical fuse 51, 51', 51" is not formed with holes nor other interruptions in the material.

The shape of the first mechanical fuse 51' is obtained by a circumferential extension of a radially varying profile with a distinctive necking. The expected shear area (i.e. in circumferential direction) for the first mechanical fuse 51', weakest for the shear bulk stress, is defined by the diameter D (measured from the rotational axis 9 to the location of the mechanical fuse 51') and the thickness of the plate t, and it amounts to $\pi*D*t$. The great advantage of the continuous and smooth design feature is that it suffers less from fatigue due to bending, if an unwanted load was to occur.

A similar definition would apply to the second mechanical fuse 51".

A continuous mechanical fuse 51, 51', 51", as e.g. the thinning of the material shown in FIG. 7, is to be preferred for this reason.

Figure 8:
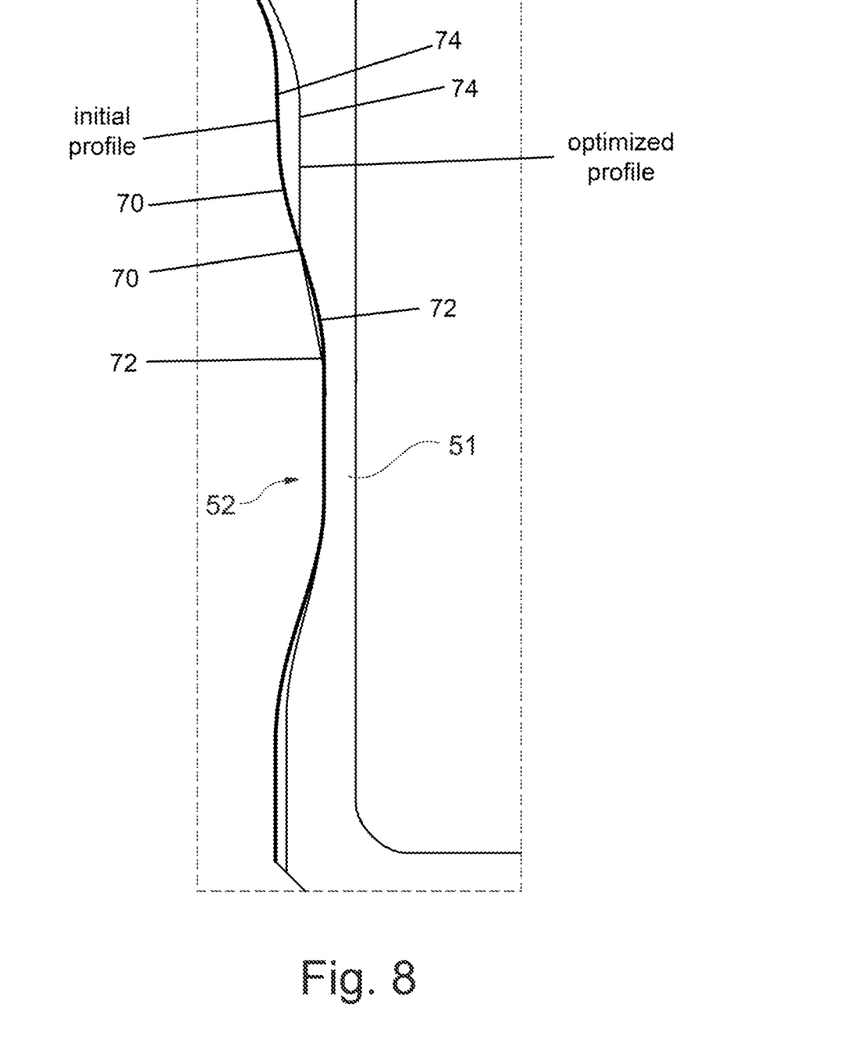
FIG. 8 is a schematic view of a profile of a mechanical fuse in the cross-section with an initial profile and an optimized profile.

The mechanical fuse 51 design in the embodiment of FIG. 8 is optimized for fatigue stress, both for low cycle and high cycle fatigue, with the oval dashed line merely highlighting the convex, concave and constant width sections.

There exists an optimum thickness of the profile just above the tearing line of the mechanical fuse 51. If the thickness is higher than the optimal one (e.g. thicker line-→initial profile), the fatigue stress due to bending on each side of the thinnest section (diameter of mechanical fuse 51) will be more concentrated at maximum bending plane (top/bottom points) and thus higher.

Local point-like bending stress on mechanical fuse 51 decreases with the decrease of the upper section (i.e. radially outward) thickness decrease. This is because the bending load gets transferred from the bottom tubular section onto the vertical plate section 52 in a more flexible homogenous manner. Thus, the overall stress distribution on the plate section is more regular/homogenous and the locally concentrated peak bending stress gets significantly reduced. So we have got a better usage of material and also some weight saving too. Then, the vertical plate portion 52 of the ring gear mount 62 is on average more bending-stressed, but that stress distributes more evenly over a bigger area.

This upper section thinning however comes with penalty. When it is below the optimal thickness, it starts to experience local stress (above the mechanical fuse 51) due to bending similar to or even higher than the one at the mechanical fuse 51.

An important feature to reduce stress is the thickness and shape of the section just radially outward from the mechanical fuse 51. The continuous thick line is the initial profile around the mechanical fuse 51. Close to the mechanical fuse 51 the profile 52 comprises essentially a convex thinning of the material. Radially outward, the thickness increases strictly monotonous.

The optimized profile 52 is concave around the mechanical fuse 51. But radially outward the profile is not strictly monotonous, as the thickness is constant for at least some section.

The thinner the profile is radially outward from the mechanical fuse 51, the stress peak at the very necking gets significantly lower, and the stress on that upper section increases. This way a more evenly distributed stress over a bigger area is achieved, and the local peak stress (valid for fatigue) gets reduced. Furthermore, a weight decrease has been achieved on the occasion of the stress optimization.

It will be understood that the invention is not limited to the embodiments above described and various modifications and improvements can be made without departing from the concepts described herein. Except where mutually exclusive, any of the features may be employed separately or in combination with any other features and the disclosure extends to and includes all combinations and sub-combinations of one or more features described herein.

REFERENCE NUMBERS 9 principal rotational axis
10 gas turbine engine
11 engine core
12 air intake
14 low-pressure compressor
15 high-pressure compressor
16 combustion equipment
17 high-pressure turbine
18 bypass exhaust nozzle
19 low-pressure turbine
20 core exhaust nozzle
21 nacelle
22 bypass duct
23 propulsive fan
24 stationary support structure, stationary structure
26 shaft, sun shaft
27 interconnecting shaft
28 sun gear
30 gearbox, power gearbox, epicyclic gearbox
32 planet gears
34 planet carrier
36 linkages
38 ring gear
40 linkages
50 torque limiting device 51 mechanical fuse with a predetermined weakening in the connection structure
51' mechanical fuse in a radially oriented plate
51" mechanical fuse in an axially oriented section of the ring gear mount
52 profile in the cross section of a part in the connection structure
52' profile in cross-section around the mechanical fuse in a radially oriented plate
52" profile in cross-section around the mechanical fuse in an axially oriented section of the ring gear
60 connecting structure
61 ring gear support
62 ring gear mount
63 stationary structure
64 retention plate
65 circumferential plate

The invention claimed is:

1. A torque limiting device in a gas turbine engine, the gas turbine engine comprising:
an epicyclic gearbox including a ring gear;
a stationary structure of the gas turbine engine;
the torque limiting device comprising:
a torque bearing connecting structure connecting the ring gear to the stationary structure and forming a load bearing path between the ring gear and the stationary structure;
a mechanical fuse in the torque bearing connecting structure comprising an at least partially circumferential weakening of a wall of the torque bearing connecting structure;
a retention plate being L-shaped in cross section, including a first portion extending radially outwards from the torque bearing connecting structure and a second portion extending axially along the torque bearing connecting structure, the retention plate configured to control axial and radial positioning of a portion of the torque bearing connecting structure that has become free to move upon fracture of the mechanical fuse.

2. The torque limiting device according to claim 1, wherein the at least partially circumferential weakening of the wall of the torque bearing connecting structure comprises a reduction in a cross-section of material of the wall.

3. The torque limiting device according to claim 1, wherein the mechanical fuse comprises a fully circumferential weakening of material of the wall.

4. The torque limiting device according to claim 1, wherein the mechanical fuse is configured to release under shear stress.

5. The torque limiting device according to claim 1, wherein the mechanical fuse comprises a smooth profile in cross-section, free of interruptions or holes.

6. The torque limiting device according to claim 5, wherein the profile comprises a convex section, a concave section, and at least one section with a constant width radially outward from the mechanical fuse.

7. The torque limiting device according to claim 1, wherein the at least partially circumferential weakening of the wall of the torque bearing connecting structure is continuous and axisymmetric around a rotational axis of the gas turbine engine.

8. The torque limiting device according to claim 1, wherein the mechanical fuse is positioned in a plate radially extending away from the torque bearing connecting structure.

9. The torque limiting device according to claim 1, wherein the mechanical fuse is positioned in an axially oriented section in a ring gear mount of the epicyclic gearbox.

10. The torque limiting device according to claim 1, wherein the mechanical fuse is positioned on an output side of the epicyclic gearbox, in a stationary part.

11. The torque limiting device according to claim 1, wherein the epicyclic gearbox has a planetary, a solar or a star configuration.

12. A gas turbine engine for an aircraft comprising:
an engine core comprising a turbine, a compressor, and a core shaft connecting the turbine to the compressor;
a fan located upstream of the engine core, the fan comprising a plurality of fan blades; and
the torque limiting device according to claim 1, wherein the epicyclic gearbox receives an input from the core shaft and outputs drive to the fan so as to drive the fan at a lower rotational speed than the core shaft.

13. The gas turbine engine according to claim 12, wherein:
the turbine is a first turbine, the compressor is a first compressor, and the core shaft is a first core shaft;
the engine core further comprises a second turbine, a second compressor, and a second core shaft connecting the second turbine to the second compressor; and
the second turbine, second compressor, and second core shaft are arranged to rotate at a higher rotational speed than the first core shaft.

14. The torque limiting device according to claim 1, wherein:
the first portion of the retention plate extending radially outwards extends parallel to a radially extending portion of the torque bearing connecting structure and the second portion of the retention plate extending axially extends parallel to an axially extending portion of the torque bearing connecting structure.

15. The torque limiting device according to claim 14, wherein the radially extending portion of the torque bearing connecting structure includes at least a portion of the at least partially circumferential weakening of the wall of the mechanical fuse.

16. The torque limiting device according to claim 14, wherein the axially extending portion of the torque bearing connecting structure includes at least a portion of the at least partially circumferential weakening of the wall of the mechanical fuse.

17. The torque limiting device according to claim 1, wherein the mechanical fuse comprises a smooth profile in cross-section, free of interruptions or holes;
wherein the smooth profile includes the at least partial circumferentially weakening of the wall, bounded, in order and on each side, a concave section, a convex section and a section with a constant width.

18. A torque limiting device in a gas turbine engine, the gas turbine engine comprising:
an epicyclic gearbox including a ring gear;
a stationary structure of the gas turbine engine;
a torque bearing connecting structure connecting the ring gear to the stationary structure and forming a load bearing path between the ring gear and the stationary structure;
the torque bearing connecting structure comprising the torque limiting device which further includes a mechanical fuse with an at least partially circumferential weakening of a wall of a circumferential plate, the at least partially circumferential weakening of the wall comprising a smooth profile in cross-section free of interruptions or holes formed along a radial length direction of the at least partially circumferential weakening of the wall;

wherein the smooth profile is bounded and includes in a sequential order and on at least one side of the at least partially circumferential weakening of the wall in the radial length direction of the at least partially circumferential weakening of the wall:

a concave section, a convex section, and a largest width section having a constant width, wherein the concave section has a smaller width than the convex section and the convex section has a smaller width than the largest width section having the constant width, the concave section being located adjacent to the mechanical fuse.

\* \* \* \* \*